United States Patent
Van Haegendoren et al.

(10) Patent No.: US 7,805,637 B2
(45) Date of Patent: Sep. 28, 2010

(54) NETWORK EQUIPMENT AND A METHOD FOR MONITORING THE START UP OF SUCH EQUIPMENT

(75) Inventors: Ben Van Haegendoren, Oelegem (BE); Koen De Bruyn, Lier (BE); Dirk Van De Poel, Rijkevorsel (BE)

(73) Assignee: Thomson Licensing, Boulogne Billancourt (FR)

( * ) Notice: Subject to any disclaimer, the term of this patent is extended or adjusted under 35 U.S.C. 154(b) by 516 days.

(21) Appl. No.: 10/561,142

(22) PCT Filed: Jun. 25, 2004

(86) PCT No.: PCT/EP2004/006976

§ 371 (c)(1),
(2), (4) Date: Dec. 19, 2005

(87) PCT Pub. No.: WO2005/003974

PCT Pub. Date: Jan. 13, 2005

(65) Prior Publication Data

US 2006/0156140 A1     Jul. 13, 2006

(30) Foreign Application Priority Data

Jun. 30, 2003 (EP) .................................. 03447177

(51) Int. Cl.
*G06F 11/00* (2006.01)

(52) U.S. Cl. .............................. 714/47; 714/48; 714/57

(58) Field of Classification Search .................. 714/57, 714/47, 48, 25; 717/170, 171, 172
See application file for complete search history.

(56) References Cited

U.S. PATENT DOCUMENTS

| 5,940,074 | A | * | 8/1999 | Britt et al. | 715/749 |
|---|---|---|---|---|---|
| 5,978,911 | A | * | 11/1999 | Knox et al. | 713/1 |
| 6,138,249 | A | * | 10/2000 | Nolet | 714/25 |
| 6,151,643 | A | * | 11/2000 | Cheng et al. | 710/36 |
| 6,421,777 | B1 | * | 7/2002 | Pierre-Louis et al. | 713/2 |
| 6,763,403 | B2 | * | 7/2004 | Cheng et al. | 710/36 |
| 6,832,373 | B2 | * | 12/2004 | O'Neill | 717/171 |
| 6,901,536 | B2 | * | 5/2005 | Davenport | 714/39 |

(Continued)

FOREIGN PATENT DOCUMENTS

EP     1100014     5/2001

(Continued)

OTHER PUBLICATIONS

Search Report Dated Oct. 31, 2005.

*Primary Examiner*—Joshua A Lohn
(74) *Attorney, Agent, or Firm*—Robert D. Shedd; Joseph J. Opalach; Reitseng Lin

(57) ABSTRACT

The invention concerns a network equipment for connection to a local network and a method for monitoring the start up of a such an equipment. This equipment comprises a persistent memory for storing software and advantageously also comprises:
  communication means for connection to said network,
  means for monitoring the start up of the equipment in order to detect a software failure,
  means for generating a software failure signal in response to the detection of a failure on the network, wherein said notification is broadcast on the network for reception by said at least one software server.

20 Claims, 3 Drawing Sheets

U.S. PATENT DOCUMENTS

| | | |
|---|---|---|
| 7,080,141 B1 * | 7/2006 | Baekelmans et al. ........ 709/224 |
| 7,251,725 B2 * | 7/2007 | Loison et al. ................... 713/1 |
| 7,398,382 B2 * | 7/2008 | Rothman et al. ............... 713/2 |
| 2002/0095619 A1 * | 7/2002 | Marsh ......................... 714/23 |
| 2002/0099971 A1 * | 7/2002 | Merkin et al. .................. 714/6 |
| 2003/0065763 A1 * | 4/2003 | Swildens et al. ............ 709/224 |
| 2006/0179476 A1 * | 8/2006 | Challener et al. ............... 726/4 |
| 2006/0277299 A1 * | 12/2006 | Baekelmans et al. ........ 709/224 |

FOREIGN PATENT DOCUMENTS

| | | |
|---|---|---|
| WO | WO 98/54642 | 12/1998 |

* cited by examiner

NETWORK EQUIPMENT AND A METHOD FOR MONITORING THE START UP OF SUCH EQUIPMENT

The present invention relates to a network equipment and to a method for monitoring the software start up of a such an equipment.

Stand-alone networking equipment, such as a DSL modem, a bridge or a router or a combination thereof, is used for example to interface a local area network with an access network such as the Internet.

Commonly, stand alone equipment comprise a persistent memory, also called on board memory means, such as a read only memory (ROM) and/or an electrically erasable programmable read only memory (EEPROM). This memory contains among others, data and software necessary to initiate the start up and run the equipment such as equipment configuration parameters, boot software and firmware.

To secure their start up, some stand alone equipments contain two copies of some of the items mentioned above i.e. the equipment configuration, the boot software and the firmware. But, some modems may have a persistent memory just large enough to contain a single copy of these data.

In that case, if these data are corrupted, the equipment ceases functioning properly until the persistent memory recovers a new valid firmware or configuration or boot program.

This situation might occur, for example, when the modem downloads upgraded software from an appropriate server. As the persistent memory can hold only one copy of the software, the old software is erased before the updated one is fully recorded. If the connection is cut off or if the equipment is powered down during the download, the software is corrupted.

It may also happen that the equipment comes to a halt during the power up phase or reboots automatically because of a software or hardware default.

In such cases, the equipment usually ceases functioning properly and notifies the problem status to the end user by means of a LED indicator.

It is known, for example from U.S. Pat. No. 6,526,092, to allow a modem to download updated operating code over a phone line to a host personal computer and reprogramming the modem's memory over a serial port from the host personal computer. This process is under user control.

The present invention proposes a network equipment for connection to a local network, said network comprising at least one software server, said equipment comprising a persistent memory for storing software, characterized in that it comprises:

communication means for connection to said network,
means for monitoring the start up of the equipment in order to detect a software failure,
means for generating a software failure signal in response to the detection of a failure by the monitoring means, and for automatically sending a notification of the failure on the network, wherein said notification is broadcast on the network for reception by said at least one software server.

Thus, the user need not intervene in the failure correction process, unless the server decides this is required. Preferably, the server comprises an application for analysing the failure type and for automatically taking corrective actions.

In particular, according to a preferred embodiment of the invention, when the failure is a software start up failure, the means for generating a failure signal are adapted to requesting the automatic download of replacement software in the memory means from the software server.

Thus, this embodiment's persistent memory needs to hold only one software copy and has the same level of robustness as an equipment holding two copies of the software or data.

Advantageously, the software download is done without any delay.

The present invention also proposes a method for monitoring the software start up of a network equipment, the equipment comprising a persistent memory for storing software and communication means for connection to a network comprising at least one software server, this process comprising the steps of:

monitoring the software start up of the equipment in order to detect a software start up failure,
generating a software start up failure signal in response to the detection of a start up software failure,
automatically broadcasting the software failure signal on the network for reception by said at least one software server.

The teaching of the present invention can be readily understood by considering the following detailed but non-restricting description of an embodiment of the invention, together with the drawings, wherein:

FIG. 1 shows a block diagram of a system incorporating a stand-alone equipment 1 according to the present invention.

Figure 1:
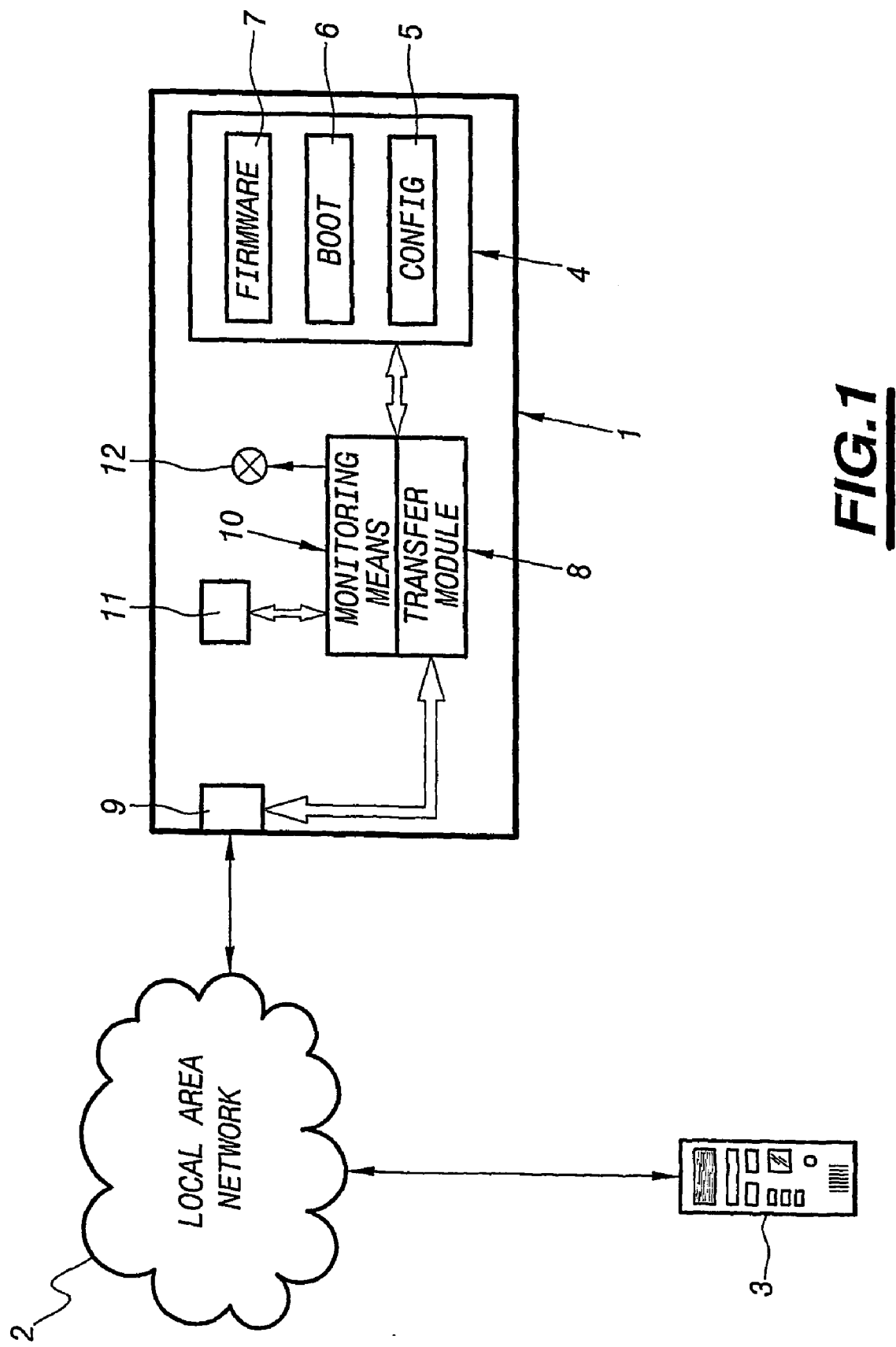
FIG. 1 shows a block diagram of a system encompassing the network equipment according to the present embodiment.

This network equipment 1 consists in any device able to process data transfer communication. It can be, for example, a DSL type modem or another stand-alone networking equipment. The equipment is connected to a local area network 2, to which is also connected a server 3 and/or a device with a failure processing application (not shown).

The network equipment 1 is provided with persistent on board memory means 4 such as an Electrically Erasable Programmable Read Only Memory (EEPROM). This persistent memory holds a plurality of items. According to the present embodiment, it stores among others data and software programs necessary for the start up and functioning of the equipment: e.g. equipment configuration parameters 5, a boot software 6 and a firmware 7.

The equipment configuration 5 is a set of parameters containing among others the serial number and the network address of the modem.

Firmware 7 consists in any software written in a memory that is not erasable by an application level software, i.e. which has a certain protection. In the present embodiment, firmware comprises e.g. the modem's operating system. Although in what follows, the firmware may be replace globally by a download, the firmware may comprise distinct items, and the invention is not limited to a bulk download but also extends to testing and downloading separate items.

As a matter of fact, the stand-alone equipment 1 comprises also a data processing unit such as a microprocessor running the different programs and a non-persistent memory, not represented for clarity reason. Prior to execution, software stored in the persistent memory is copied to the non-persistent memory (e.g. RAM).

The stand-alone equipment comprises also a data transfer module 8 between the on board memory means 4 and network communication means 9 connected to the network 2.

This transfer module 8 can employ for example the standardized Bootstrap protocol (BOOTP), and the file transfer protocol (TFTP) to exchange information between the server 3 and the equipment 1 via the local area network 2. The equipment being a DSL modem according to the present embodiment, it also comprises a corresponding PSTN interface and associated circuitry to carry out its DSL functionalities. These items are well known in themselves and not represented in FIG. 1.

Modules 8 and 10 may either be hardware implemented or be software modules run by the microprocessor from the non-persistent memory.

According to this invention, the stand-alone equipment 1 comprises also monitoring means 10 able to control the start up of the software of the equipment.

These monitoring means 10 check, among other things, validity, presence and correct start up of the firmware 7 and the validity of the configuration data 5. Checking of the boot software copy in persistent memory is also possible, but will not be discussed in more detail.

In case of any problem during in particular the start up process, these monitoring means 10 generate a firmware start up failure signal which is transmitted by the transfer module 8 and the communication means 9 through the data transfer network 2 to the software server 3.

This failure signal, notified to the software server 3, is associated to a BOOTP request of downloading of replacement firmware by the server. A frame portion of the BOOTP protocol used for sending this failure signal, specifies the kind of software to be downloaded or the appropriate failure signal. This frame portion can be, for instance, the "vendor specific optional field" of the BOOTP protocol.

It is assumed that an application in the data transfer network 2, illustratively the software server 3, maintains a data base wherein program codes and replacement software and/or configuration data are stored.

In response to this BOOTP request, this server 3 transmits replacement software to the network equipment, through the network 2, using the TFTP protocol of the transfer module 8 and the communication means 9.

In practice, the BOOTP message comprises a number of failure states of the equipment, following the process detailed below. Another device on the local area network will interpret these states and decide on a corrective action, typically including a replacement software download, but may also include notifying failure information to a user.

Advantageously, the monitoring means 8 can also be associated to a button 11 which can be operated manually by the user to trigger the request of a firmware and/or boot software download over the network.

Preferably, a visual or a sounding alarm 12 is connected to the monitoring means 10 for notifying a start up failure to the user.

Figure 2:
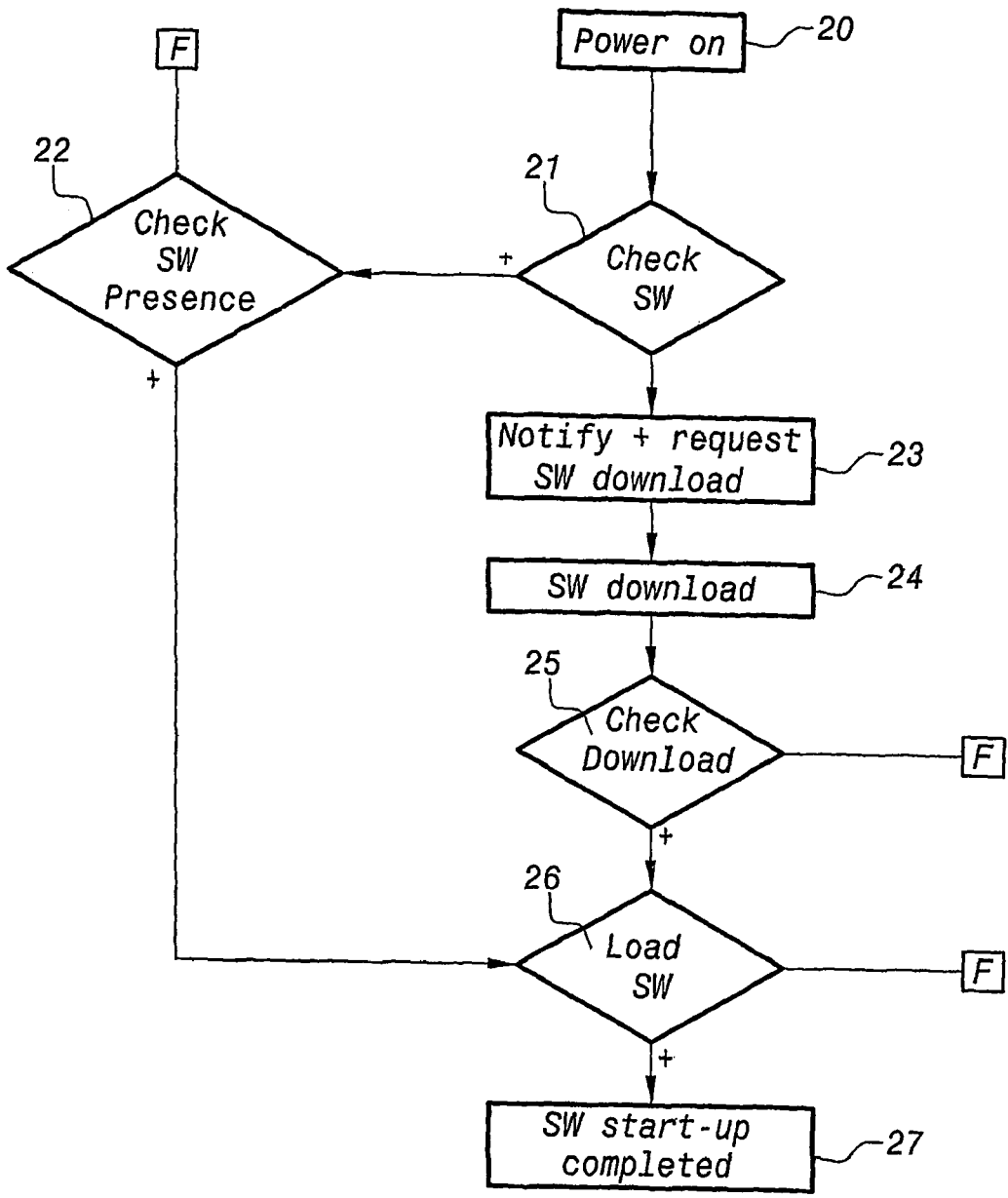
FIG. 2 depicts schematically a flow diagram of a processing method suitable for use in the system of FIG. 1 and in accordance with the principles of the present embodiment.

FIG. 2 shows a flow diagram which illustrates a simplified version of the start up process of the stand alone equipment 1 according to the present embodiment. The shown steps relate mainly to testing the validity and presence a software like for example a firmware in memory 4.

At the time of the power on (step 20) of the stand-alone equipment 1, monitoring means 10 launch a firmware testing step 21 concerning the firmware necessary to start up the equipment 1. If no problem is detected during this testing step, monitoring means 10 check, in step 22, if the firmware is stored in the on board memory means 4.

If the firmware is missing, the monitoring means 10 generate a software start up failure signal F, and reboot the equipment 1.

At step 23, if the testing step 21 is not successfully performed, the monitoring means 10 request the downloading of a replacement firmware from the software server 3 through the transfer network 2 by using the BOOTP protocol of the transfer module 8 and the communication means 9.

At step 24, the software server 3 downloads a replacement firmware through the transfer network 2 by using the TFTP protocol of the transfer module 8 and the communication means 9.

At step 25, the monitoring means 10 control the correctness of the downloading. When, for example the downloading has been interrupted, the monitoring means 10 generate a specific firmware failure signal F (comprising the identification of the failure type), and reboot the equipment 1 so that a new download may be initiated.

If the tests are correctly performed, the monitoring means 10 load, during step 26, the firmware and set a start up failure flag and a timer to determine a start up time limit. The flag is reset by the firmware if it performs its start up properly. If the software start up is not completed once the start up time limit is reached, the flag is still set, and the monitoring means 10 generate a software start up failure signal F (also comprising an identification of the failure type, different from the first failure type above), and reboot the equipment 1. Otherwise, at step 27, when the software start up is properly executed it resets the software start up flag and no failure signal is generated.

Advantageously, according to the embodiment, the network equipment 1 provides an automatic request and an automatic downloading of a replacement software in case of firmware start up failure or absence of firmware. Thus, e.g. start up failures are repaired automatically and the user does not even notice the existence of a failure.

Figure 3:
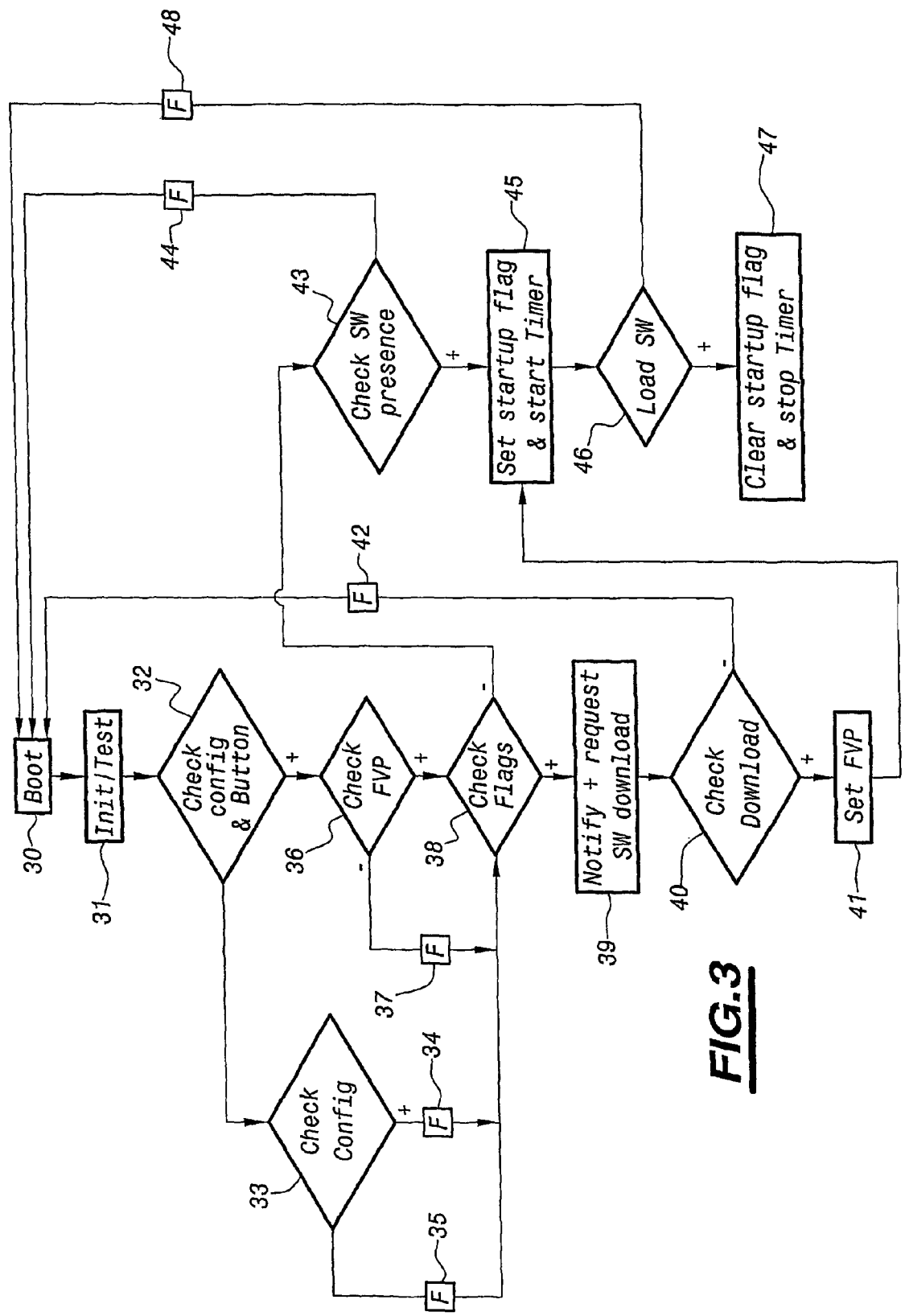
FIG. 3 depicts schematically a flow diagram of the method illustrated in FIG. 2 with more details.

Specifically, the block diagram of FIG. 3 shows the details of the start up process of the stand alone equipment according to the embodiment.

The process begins at step 30, when a power on condition is initiated for the network equipment. The process of FIG. 3 is then executed by the monitoring means 10, using the well known BOOTP and TFTP protocols.

At step 31, initial tests are executed. Typically, the monitoring means 10 check the availability of the persistent memory 4 and the proper operation of the non persistent memory.

At step 32, advantageously and in accordance with the present invention, a determination is made as to whether there is an equipment configuration failure or whether the end user has pressed the activation button 11 to request a software downloading.

If one of these situations occurs, monitoring means 10 jump in step 33, and control the validity of the configuration data stored in the on board memory means 4.

Equipment configurations 5 are often secured by a signature or a checksum. This signature or checksum is registered in the on board memory means 4 of the equipment 1. A classical and easy way to control the validity of an equipment configuration consists in recalculating its checksum and comparing it to the registered one. If there is a mismatch, the equipment configuration 5 is no more valid. In that case, the monitoring means 10 set up a corresponding failure flag 34.

Advantageously, this flag 34 is encoded to deliver information about the type of failures encountered. In the above mentioned case, the failure flag 34 comprises an information status indicating the presence of an equipment configuration failure.

Depending on the type of configuration data, the configuration data failure may or may not be correctable through a download. In the latter case, the BOOTP message issued by the equipment is interpreted by other network devices as indicating that the equipment cannot be used any more and is to be considered as dead.

If the configuration is valid in step 33, that means that the end user has pressed the button 11 to trigger the download of firmware. Thus, the monitoring means 10 set also a software start up failure flag 35. This failure flag 35 specifies that the user has requested a firmware download.

If no downloading has been requested and in the absence of an equipment configuration's problem, the monitoring means 10 check, after step 32, the validity of the firmware program 7 registered in the on board memory means 4 during step 36.

A simple way to do that consists in controlling the presence and the validity of its verification pattern (FVP for Flash Verification Pattern). The verification pattern is a classical tool for checking the integrity of software or data. When the firmware is successfully recorded in the persistent memory 4 a verification pattern is calculated and also written into memory 4. Should the equipment suffer a power failure or another problem during the storage of the firmware, the verification pattern corresponding to this firmware is either not stored or wrong.

Therefore, at step 36, the monitoring means 10 check the validity of the firmware with the help of the firmware verification pattern. If the pattern is not valid, then a failure flag 37 is set. As for the other testing steps, this particular failure flag indicates the nature of the failure.

At step 38, the monitoring means 10 check the setting of the failure flags 34, 35, 37. If at least one flag is set, the monitoring means 10 will automatically send a failure signal to the server 3 through the transfer network 2 using the BOOTP protocol of the transfer module 8 and the communication means 9. This message contains the failure flag state.

Applications bundled with network devices, such as an application of the software server 3, listen for these signals and interpret the failure status information. After interpretation of this information, these applications decide, preferably without any end user intervention, on an action comprising at least one of starting a firmware download to the network equipment 1 and/or notifying the problem to the user. e.g. in case of occurrence of a fatal configuration failure, the user is notified since no correction of the failure may be possible. The user may also be notified if a download is not performed correctly after a certain number of retries. A counter of tries may be implemented for this purpose and increment appropriately after each BOOTP message requesting e.g. a firmware download.

Specifically, the transfer module 8 indicates the problem status in the "vendor optional specific field" of an appropriate BOOTP protocol message sent on the network by the monitoring means 10. This field is of standard use to communicate to an application certain restrictions or additional client information.

In other words, the message is preferably broadcast on the network and not specifically to a predetermined server. Any one of the devices on the network may act as a server provided it has the right application to listen to, analyze and respond to the message.

After its downloading, the replacement software is stored in the persistent on board memory means 4. This step has reference 39.

At step 40, the monitoring means 10 control that the replacement software has been downloaded without any interruption and that it has been correctly recorded.

When the software downloaded is a firmware, the data processing unit checks the replacement firmware and calculates its flash verification pattern (FVP) and records it in the memory 4 at step 41.

If the replacement software is damaged or incorrectly downloaded or recorded, the monitoring means 10 sets a corresponding failure flag 42. Then, the stand alone equipment 1 is rebooted. Of course, the flags are stored in such a way as to be unaffected by the rebooting process. At step 31, the device tests whether flag 42 is set and sends a corresponding BOOTP message to request a firmware download.

At step 43, if no failure flag has been detected at step 38, the monitoring means 10 control the presence of the firmware in the on board memory means 4. There are different methods available for checking this presence. For instance, the firmware's presence can be checked with the detection of a specified identification code in a fixed location of the firmware code. Other methods can also be used in accordance with this invention.

If no software is registered, the monitoring means 10 set a failure flag 44 and the modem is rebooted at step 30 to process the failure based on the set flag as above.

If step 41 or step 43 are executed without any problem, the monitoring means 10 set a start up flag and trigger a start timer, at step 45, before loading and starting the firmware at step 46.

After a successful start up, the start up flag is reset by the firmware, confirming that it started properly. However, if the start up is not performed before the start time has elapsed, the monitoring means 10 set a problem flag 48 and reboot the equipment at step 30 to process the corresponding failure.

To summarize, the process of FIG. 3 defines five problem states:

software (firmware) start-up error: the firmware either halts during start-up or reboots without correctly starting up;

invalid configuration;

failed software (firmware) download (e.g; interruption of download process);

absence of software;

writing of downloaded software to persistent memory failed verification pattern incorrect).

Other states may trigger a download of software:

a mechanical button of the device was pressed by the user to request a firmware download;

the firmware received a request over the network to perform a firmware update.

Flags are checked by the monitoring means either at the beginning of the boot process, or during its execution. A download can be requested explicitly, or the decision as to a download should be left to an application listening to the device's messages.

This invention is not restricted to the preferred embodiment herewith disclosed. In particular, any kind of software or data can be downloaded. And this process can also be performed with protocols differing from the TFTP and BOOTP protocols.

The invention claimed is:

1. Network equipment for providing a connection to a local network, said local network comprising at least one software server, said network equipment comprising:

a memory for storing software;

means for providing a connection to said local network; and means for monitoring a start up of the network equipment to detect a software start up failure, and for generating a software start up failure signal in response to detecting said software start up failure, said software start up failure signal being broadcast on the local network for reception by said at least one software server, said software start up failure signal comprising information specifying at least one of:
(i) a nature of said software start up failure, an identification of replacement software to be downloaded, and an identification of a version of the software currently stored in the memory;
(ii) said nature of said software start up failure, and said identification of replacement software to be downloaded; and
(iii) said nature of said software start up failure, and said identification of said version of the software currently stored in the memory.

2. The network equipment according to claim 1, wherein the software comprises at least one of:
a boot program;
configuration data; and
firmware.

3. The network equipment according to claim 2, wherein the software comprises said firmware, and the monitoring means comprises:
means for checking a current firmware verification pattern; and
means for generating said software start up failure signal when said current firmware verification pattern is not valid.

4. The network equipment according to claim 2, wherein the monitoring means comprises:
means for checking for a presence of the firmware in the memory;
means for rebooting the network equipment if the firmware is not stored in the memory; and
means for generating said software start up failure signal if the firmware is not stored in the memory.

5. The network equipment according to claim 2, wherein the software comprises said firmware, and the network equipment comprises:
means for writing a replacement firmware verification pattern corresponding to replacement firmware downloaded in the memory if said replacement firmware is properly recorded in said memory.

6. The network equipment according to claim 1, wherein the monitoring means comprises:
means for calculating a checksum of the software currently stored in said memory;
means for comparing said calculated checksum to a previously stored checksum; and
means for generating the software start up failure signal when said calculated checksum is not identical to the previously stored checksum.

7. The network equipment according to claim 1, wherein the monitoring means comprises:
means for monitoring downloading of replacement software in the memory; and
means for rebooting the network equipment and for generating said software start up failure signal if a problem is detected during said downloading.

8. The network equipment according to claim 1, wherein the monitoring means comprises:
means for monitoring a process of loading said software in said memory; and
means for rebooting the network equipment and for generating said software start up failure signal if a problem is detected during said loading.

9. The network equipment according to claim 1, wherein the monitoring means comprises:
a timer to determine a time limit for a software start up;
means for launching the software start up; and
means for generating said software start up failure signal if the software start up is not completed before an end of the time limit.

10. The network equipment according to claim 1, further comprising user activation means connected to the monitoring means for enabling a user to manually request a download of replacement software.

11. The network equipment according to claim 1, further comprising an alarm connected to the monitoring means for communicating the software start up failure to the user.

12. The network equipment according to claim 1, wherein the monitoring means comprises:
means for checking a setting of a failure flag; and
means for generating the software start up failure signal and for transmitting the software start up signal on the local network in response to detecting that the failure flag is set.

13. The network equipment according to claim 1, wherein an indication of the nature of the software start up failure comprises a series of status flags.

14. A method for monitoring a software start up for network equipment, the network equipment comprising a memory for storing software and a connector for providing a connection to a local network comprising at least one software server, said method comprising the steps of:
monitoring the software start up for the network equipment to detect a software start up failure;
generating a software start up failure signal in response to detecting said software start up failure; and
automatically broadcasting the software start up failure signal on the local network for reception by said at least one software server, wherein the software start up failure signal comprises information specifying at least one of:
(i) a nature of said software start up failure, an identification of replacement software to be downloaded, and an identification of a version of said software currently stored in said memory;
(ii) said nature of said software start up failure, and said identification of replacement software to be downloaded; and
(iii) said nature of said software start up failure, and said identification of said version of the software currently stored in said memory.

15. The method according to claim 14, wherein the software start up failure signal comprises a request to the at least one software server for the download of the replacement software in the memory.

16. The method according to claim 14, wherein the software start up failure signal comprises an identification of the software start up failure for analysis by the at least one software server.

17. Network equipment for providing a connection to a local network, said local network comprising at least one software server, said network equipment comprising:
a memory for storing software;
means for providing a connection to said local network; and
means for monitoring a start up of the network equipment to detect a software start up failure, and for generating a software start up failure signal in response to detecting said software start up failure, said software start up failure signal being sent broadcast on the local network for reception by said at least one software server, said software start up failure signal comprising information specifying a nature of said software start up failure.

18. The network equipment according to claim 17, wherein the software comprises at least one of:
  a boot program;
  configuration data; and
  firmware.

19. The network equipment according to claim 18, wherein the software comprises said firmware, and the monitoring means comprises:
  means for checking a current firmware verification pattern; and
  means for generating said software start up failure signal when said current firmware verification pattern is not valid.

20. The network equipment according to claim 17, wherein the monitoring means comprises:
  means for calculating a checksum of the software currently stored in said memory;
  means for comparing said calculated checksum to a previously stored checksum; and
  means for generating the software start up failure signal when said calculated checksum is not identical to the previously stored checksum.

* * * * *

UNITED STATES PATENT AND TRADEMARK OFFICE
CERTIFICATE OF CORRECTION

PATENT NO. : 7,805,637 B2
APPLICATION NO. : 10/561142
DATED : September 28, 2010
INVENTOR(S) : Ben Van Haegendoren, Koen De Bruyn and Dirk Van De Poel It is certified that error appears in the above-identified patent and that said Letters Patent is hereby corrected as shown below:

In the Claims:

Column 9, line 2, in claim 17: the text, "being sent broadcast", should read -- being broadcast --.

Signed and Sealed this
First Day of October, 2013

Teresa Stanek Rea
*Deputy Director of the United States Patent and Trademark Office*